(12) United States Patent
Pinder et al.

(10) Patent No.: US 7,496,198 B2
(45) Date of Patent: *Feb. 24, 2009

(54) PARTIAL DUAL ENCRYPTED STREAM UTILIZING PROGRAM MAP TABLES

(75) Inventors: Howard Pinder, Norcross, GA (US); Jonathan Bradford Evans, Atlanta, GA (US); Anthony J. Wasilewski, Alpharetta, GA (US); William D. Woodward, Jr., Lilburn, GA (US)

(73) Assignee: Cisco Technology, Inc., San Jose, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 11/275,051

(22) Filed: Dec. 6, 2005

(65) Prior Publication Data

US 2006/0233369 A1    Oct. 19, 2006

Related U.S. Application Data

(63) Continuation of application No. 10/719,161, filed on Nov. 21, 2003, now abandoned, which is a continuation-in-part of application No. 10/629,839, filed on Jul. 30, 2003, now Pat. No. 7,224,798, and a continuation-in-part of application No. 10/602,988, filed on Jun. 25, 2003, and a continuation-in-part of application No. 10/602,987, filed on Jun. 25, 2003, which is a continuation-in-part of application No. 10/602,986, filed on Jun. 25, 2003, which is a continuation of application No. 09/930,901, filed on Aug. 16, 2001, now Pat. No. 6,937,729, which is a continuation of application No. 09/487,076, filed on Jan. 19, 2000, now Pat. No. 6,292,568, which is a continuation of application No. 09/126,783, filed on Jul. 31, 1998, now abandoned, and a continuation-in-part of application No. 09/111,958, filed on Jul. 8, 1998, now abandoned, and a continuation-in-part of application No. 08/767,535, filed on Dec. 16, 1996, now Pat. No. 6,005,938, and a continuation-in-part of application No. 08/580,759, filed on Dec. 29, 1995, now Pat. No. 5,870,474, and a continuation-in-part of application No. 08/415,617, filed on Apr. 3, 1995, now Pat. No. 5,742,677.

(60) Provisional application No. 60/054,575, filed on Aug. 1, 1997, provisional application No. 60/054,578, filed on Aug. 1, 1997, provisional application No. 60/007,962, filed on Dec. 4, 1995.

(51) Int. Cl.
*H04N 7/167* (2006.01)
*H04L 9/32* (2006.01)
*G06F 11/30* (2006.01)

(52) U.S. Cl. .................. 380/216; 380/200; 380/201; 380/202; 380/203; 713/189; 713/190; 713/191; 713/192; 713/193; 382/232

(58) Field of Classification Search ............. 380/202, 380/216

See application file for complete search history.

(56) References Cited

U.S. PATENT DOCUMENTS 4,155,042 A    5/1979    Permut et al.

(Continued)

FOREIGN PATENT DOCUMENTS

EP            0 723 371 A    7/1996

(Continued)

OTHER PUBLICATIONS

ISO/IEC 13818-1, "Information Technology—Generic Coding of Moving Pictures and Associated Audio Systems," Draft of: Nov. 13, 1994.

(Continued)

*Primary Examiner*—Longbit Chai

(57) ABSTRACT

The present invention is suitable for use in a partial dual encrypted system. The present invention allows for two different decryption devices (e.g., an incumbent, or first, set-top and an overlay, or second, set-top) to be located in a single system having an incumbent encryption scheme and a second encryption scheme. Each set-top is designed to decrypt the first or second proprietary encryption schemes, respectively. In accordance with the present invention, the second set-top utilizes a novel program map table to ensure that the second set-top chooses correct elementary streams in the partial dual-encrypted stream (i.e., a combined stream including a first encrypted stream, a second encrypted stream, and a clear stream) for a desired program.

4 Claims, 9 Drawing Sheets

U.S. PATENT DOCUMENTS

| | | | |
|---|---|---|---|
| 4,358,672 A | 11/1982 | Hyatt et al. |
| 4,388,643 A | 6/1983 | Aminetzah |
| 4,405,829 A | 9/1983 | Rivest et al. |
| 4,531,020 A | 7/1985 | Wechselberger et al. |
| 4,600,921 A | 7/1986 | Thomas et al. |
| 4,613,901 A | 9/1986 | Gilhousen et al. |
| 4,634,807 A | 1/1987 | Chorley et al. |
| 4,649,533 A | 3/1987 | Chorley et al. |
| 4,658,093 A | 4/1987 | Hellman |
| 4,712,238 A | 12/1987 | Gilhousen et al. |
| 4,712,239 A | 12/1987 | Frezza |
| 4,736,422 A | 4/1988 | Mason |
| 4,823,385 A | 4/1989 | Hegendorfer |
| 4,864,615 A | 9/1989 | Bennett et al. |
| 4,866,770 A | 9/1989 | Seth-Smith et al. |
| 4,885,777 A | 12/1989 | Takaragi et al. |
| 4,887,296 A | 12/1989 | Horne |
| RE33,189 E | 3/1990 | Lee et al. |
| 4,912,762 A | 3/1990 | Lee et al. |
| 4,982,430 A | 1/1991 | Frezza et al. |
| 4,993,068 A | 2/1991 | Piosenka et al. |
| 5,003,591 A | 3/1991 | Kauffman |
| 5,018,196 A | 5/1991 | Takaragi et al. |
| 5,029,207 A | 7/1991 | Gammie |
| 5,036,537 A | 7/1991 | Jeffers et al. |
| 5,073,935 A | 12/1991 | Pastor |
| RE33,808 E | 1/1992 | Wright, Jr. |
| 5,124,117 A | 6/1992 | Tatebayashi et al. |
| 5,142,578 A | 8/1992 | Matyas et al. |
| 5,151,782 A | 9/1992 | Ferraro |
| 5,155,591 A | 10/1992 | Wachob |
| 5,175,765 A | 12/1992 | Perlman |
| 5,231,665 A | 7/1993 | Auld et al. |
| 5,235,643 A | 8/1993 | Anderson et al. |
| 5,237,610 A | 8/1993 | Gammie et al. |
| 5,243,652 A | 9/1993 | Teare et al. |
| 5,249,230 A | 9/1993 | Mihm, Jr. |
| 5,270,822 A | 12/1993 | Choi |
| 5,282,248 A | 1/1994 | DeJoy |
| 5,282,249 A | 1/1994 | Cohen et al. |
| 5,285,497 A | 2/1994 | Thatcher, Jr. |
| 5,301,233 A | 4/1994 | Wasilewski et al. |
| 5,343,527 A | 8/1994 | Moore |
| 5,381,477 A | 1/1995 | Beyers, II et al. |
| 5,381,481 A | 1/1995 | Gammie et al. |
| 5,400,401 A | 3/1995 | Wasilewski et al. |
| 5,402,490 A | 3/1995 | Mihm, Jr. |
| 5,414,773 A | 5/1995 | Handelman |
| 5,418,782 A | 5/1995 | Wasilewski |
| 5,420,866 A | 5/1995 | Wasilewski |
| 5,425,101 A | 6/1995 | Woo et al. |
| 5,432,542 A | 7/1995 | Thibadeau et al. |
| 5,440,633 A | 8/1995 | Augustine et al. |
| 5,465,299 A | 11/1995 | Matsumoto et al. |
| 5,473,692 A | 12/1995 | Davis |
| 5,481,542 A | 1/1996 | Logston et al. |
| 5,481,613 A | 1/1996 | Ford et al. |
| 5,488,410 A | 1/1996 | Lieberfarb et al. |
| 5,497,422 A | 3/1996 | Tysen et al. |
| 5,499,294 A | 3/1996 | Friedman |
| 5,499,295 A | 3/1996 | Cooper |
| 5,506,904 A | 4/1996 | Sheldrick et al. |
| 5,509,073 A | 4/1996 | Monnin et al. |
| 5,519,780 A | 5/1996 | Woo et al. |
| 5,524,052 A | 6/1996 | Augustine et al. |
| 5,550,984 A | 8/1996 | Gelb |
| 5,557,678 A | 9/1996 | Ganesan |
| 5,557,765 A | 9/1996 | Lipner et al. |
| 5,559,889 A | 9/1996 | Easter et al. |
| 5,563,950 A | 10/1996 | Easter et al. |
| 5,565,909 A | 10/1996 | Thibadeau et al. |
| 5,568,552 A | 10/1996 | Davis |
| 5,568,554 A | 10/1996 | Eastlake, III |
| 5,583,939 A | 12/1996 | Chang et al. |
| 5,588,058 A | 12/1996 | Le Berre |
| 5,590,202 A | 12/1996 | Bestler et al. |
| 5,621,793 A | 4/1997 | Bednarek et al. |
| 5,671,276 A | 9/1997 | Eyer et al. |
| 5,675,649 A | 10/1997 | Brennan et al. |
| 5,740,246 A | 4/1998 | Saito |
| 5,742,677 A | 4/1998 | Pinder et al. |
| 5,764,770 A | 6/1998 | Pinder et al. |
| 5,787,172 A | 7/1998 | Arnold |
| 5,857,020 A | 1/1999 | Peterson, Jr. |
| 5,862,220 A | 1/1999 | Perlman |
| 5,870,474 A | 2/1999 | Wasilewski et al. |
| 5,920,626 A | 7/1999 | Durden et al. |
| 6,005,938 A | 12/1999 | Banker et al. |
| 6,009,116 A | 12/1999 | Bednarek et al. |
| 6,105,134 A | 8/2000 | Pinder et al. |
| 6,108,365 A | 8/2000 | Rubin et al. |
| 6,246,767 B1 | 6/2001 | Akins, III et al. |
| 7,092,616 B2 | 8/2006 | Unger |
| 7,124,303 B2 | 10/2006 | Candelore |
| 7,127,619 B2 | 10/2006 | Unger et al. |
| 7,139,398 B2 | 11/2006 | Candelore et al. |
| 7,151,831 B2 | 12/2006 | Candelore et al. |
| 7,336,787 B2 | 2/2008 | Unger et al. |
| 2002/0188567 A1 | 12/2002 | Candelore |
| 2002/0194613 A1 | 12/2002 | Unger |
| 2003/0026423 A1* | 2/2003 | Unger et al. ............... 380/217 |
| 2004/0003008 A1 | 1/2004 | Wasilewski et al. |
| 2004/0107350 A1 | 6/2004 | Wasilewski et al. |
| 2004/0139337 A1 | 7/2004 | Pinder et al. |
| 2005/0152548 A1 | 7/2005 | Wasilewski |
| 2005/0259813 A1 | 11/2005 | Wasilewski et al. |

FOREIGN PATENT DOCUMENTS

| | | |
|---|---|---|
| EP | 0 752 786 A | 1/1997 |
| WO | WO 94/13107 A | 6/1994 |
| WO | WO 95/29560 A | 11/1995 |

OTHER PUBLICATIONS

ISO/IEC JTC1/SC29/WG11, "Universal Multi-Program Multiplex and Transport for MPEG-2 Systems," Jan. 1993.

ISO/IEC JTC1/SC29/WG11, "An MGEG-2 Multi-Program Multiplex Syntax," Jan. 1993.

ISO/IEC JTC1/SC2/WG11, "Requirements and Method for High-Level Multiplexing of MPEG and Other Digital Service Bitstreams with Universal Transport Layer," Nov. 1992.

Whitfield, Diffie, "Authentication and Authenticated key Exchanges," Designs, Codes and Cryptography, An International Journal, vol. 2, No. 2, Jun. 1992, pp. 107-125.

TM-1244 Rev. 4, "Final Technical Report of the Conditional Access Specialist Group," Nov. 17, 1994.

Coutrot et al., "A Single Conditional Access System for Satellite-Cable and Terrestrial TV," IEEE Transactions on Consumer Electronics, vol. 35, No. 3, Aug. 1989, pp. 464-468.

Louis Claude Guillou and jean-Luc Giachetti, "Encipherment and Conditional Access," SPTE Journal, 103 (Jun. 1994) No. 6, White Plains, NY.

Scientific-Atlanta, Inc., Pending U.S. Appl. No. 10/602,987, filed Jun. 25, 2003, Title: "Method for Partially Encrypting Program Data," Inventors: Anthony J. Wasilewski and Howard G. Pinder.

Scientific-Atlanta, Inc. Pending U.S. Appl. No. 10/602,986, filed Jun. 25, 2003, Title: "Method for Partially Encrypting Program Data," Inventors: Anthony J. Wasilewski and Howard G. Pinder.

Scientific-Atlanta, Inc. Pending U.S. Appl. No. 10/602,988, filed Jun. 25, 2003, Title: "Method for Partially Encrypting Program Data," Inventors: Anthony J. Wasilewski and Howard G. Pinder.

\* cited by examiner

PARTIAL DUAL ENCRYPTED STREAM UTILIZING PROGRAM MAP TABLES

CROSS REFERENCE TO RELATED APPLICATIONS

The present application is a continuation of application Ser. No. 10/719,161 entitled A Partial Dual-Encrypted Stream Utilizing Program Map Tables filed Nov. 21, 2003 now abandoned. The present application is also a continuation-in-part of application Ser. No. 10/629,839 entitled "Methods and Apparatus for Providing a Partial Dual-Encrypted Stream in a Conditional Access Overlay System" filed Jul. 30, 2003, now U.S. Pat. No. 7,224,798 which is a continuation-in-part of application Ser. No. 10/602,986 entitled "Method for Partially Encrypting Program Data" filed Jun. 25, 2003, which was filed simultaneously with applications having Ser. Nos. 10/602,988 and 10/602,987, which were a continuation of application Ser. No. 09/930,901 filed Aug. 16, 2001, now U.S. Pat. No. 6,937,729 which is a continuation of application Ser. No. 09/487,076, filed Jan. 19, 2000, now U.S. Pat. No. 6,292,568, which is a continuation of application Ser. No. 09/126,783, filed Jul. 31, 1998, presently abandoned, which claims the benefit of U.S. provision application No. 60/054,575, filed Aug. 1, 1997; and is a CIP of application Ser. No. 09/111,958, filed Jul. 8, 1998, now abandoned, which claims the benefit of U.S. provision application No. 60/054,578, filed Aug. 1, 1997; and is CIP of application Ser. No. 08/767,535, filed Dec. 16, 1996, now U.S. Pat. No. 6,005,938; and is a CIP of application Ser. No. 08/580,759 filed Dec. 29, 1995, now U.S. Pat. No. 5,870,474, which claims the benefit of U.S. provisional application No. 60/007,962, filed Dec. 4, 1995; and is CIP of application Ser. No. 08/415,617, filed Apr. 3, 1995, now U.S. Pat. No. 5,742,677.

The present application descends from an application, which was one of seven original applications with identical Detailed Descriptions. All of these applications have the same filing date and the same assignee. The serial numbers and filing dates of the six applications follow:

Ser. No. 09/127,352, filed Jul. 31, 1998, presently abandoned, for which a continuation Ser. No. 09/488,230 was filed on Jan. 20, 2000, which issued as U.S. Pat. No. 6,252,964, and continuation Ser. No. 09/811,085 was filed on Mar. 16, 2001, which issued as U.S. Pat. No. 6,516,412, and continuation Ser. No. 10/287,913 was filed on Nov. 5, 2002, currently pending;

Ser. No. 09/126,921, filed Jul. 31, 1998, which issued as U.S. Pat. No. 6,157,719, for which a continuation Ser. No. 09/135,615 was filed on Aug. 18, 1998, which issued as U.S. Pat. No. 6,424,714;

Ser. No. 09/127,273, filed Jul. 31, 1998, presently abandoned, for which a continuation Ser. No. 09/493,409 was filed on Jan. 28, 2000, which issued as U.S. Pat. No. 6,560,340, and for which continuation Ser. No. 10/377,416 was filed on Mar. 3, 2003, which is currently pending;

Ser. No. 09/127,152, filed Jul. 31, 1998, presently abandoned, for which a continuation Ser. No. 09/488,104 was filed on Jan. 20, 2000, which issued as U.S. Pat. No. 6,246,767; for which continuation Ser. No. 09/748,313 was filed on Dec. 26, 2000, which issued as U.S. Pat. No. 6,526,508; and for which continuation Ser. No. 09/881,428 was filed on Jun. 14, 2001, currently pending;

Ser. No. 09/126,888, filed Jul. 31, 1998, presently abandoned, for which a continuation Ser. No. 09/464,794 was filed on Dec. 16, 1999, which issued as U.S. Pat. No. 6,424,717; and Ser. No. 09/126,795, filed Jul. 31, 1998, which issued as U.S. Pat. No. 6,105,134.

FIELD OF THE INVENTION

The present invention relates generally to the field of encrypted streams in a communications system, and more specifically towards utilizing program map tables for transmitting and identifying dual encrypted streams in a communications system.

BACKGROUND OF THE INVENTION

The control of the content is important in order to protect the programming from, for example, nonpaying customers. A conventional communications system, such as a cable television system, therefore, typically applies an encryption scheme to television content in order to prevent unrestricted access. Once a system operator chooses an encryption scheme, the operator installs all of the necessary headend equipment (e.g., Scientific-Atlanta's conditional access software and associated equipment). The receiving devices (e.g., set-tops) located at the subscriber's premises must be compatible with the encryption scheme in order to decrypt the content for viewing. Due to the proprietary encryption systems, however, an operator is prevented from installing different set-tops that do not have the proper decryption keys. If the operator wishes to install different set-tops that decrypt a different conditional access system, the operator would also have to install a second proprietary encryption system to overlay the incumbent encryption system in order to use both set-tops.

It would be to the operator's advantage to be able to select set-tops from any manufacturer and easily implement different encryption/decryption schemes in the system without duplicating the headend equipment and utilizing extra bandwidth. The present application is directed towards a conditional access system that enables different proprietary set-tops to decrypt content using different decryption keys.

DETAILED DESCRIPTION OF A PREFERRED EMBODIMENT

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

The present invention is suitable for use in a partial dual encrypted system. The present invention allows for two different decryption devices (e.g., an incumbent, or first, set-top and an overlay, or second, set-top) to be located in a single system having an incumbent encryption scheme and a second encryption scheme. Each set-top is designed to decrypt the first or second proprietary encryption schemes, respectively. In accordance with the present invention, the second set-top utilizes a novel program map table to ensure that the second set-top chooses correct elementary streams in the partial dual-encrypted stream (i.e., a combined stream including a first encrypted stream, a second encrypted stream, and a clear stream) for a desired program.

More specifically, a clear multiprogram transport stream (MPTS) is provided to a headend facility. It will be appreciated that the clear MPTS includes several streams of unencrypted programs each including video, audio, and data packets. The packets each have a packet identifier (PID). Typically, an encryption scheme encrypts some or all of the packets (herein referred to as critical packets) of some or all of the programs depending upon the level of desired security. Further information regarding a conditional access system can be found in U.S. patent application Ser. No. 10/602,986 entitled "Method for Partially Encrypting Program Data" filed Jun. 25, 2003 and U.S. Pat. No. 6,424,717 entitled "Conditional Access System" filed Dec. 16, 1999, which are commonly assigned, the disclosure and teachings of which are hereby incorporated by reference.

Figure 1:
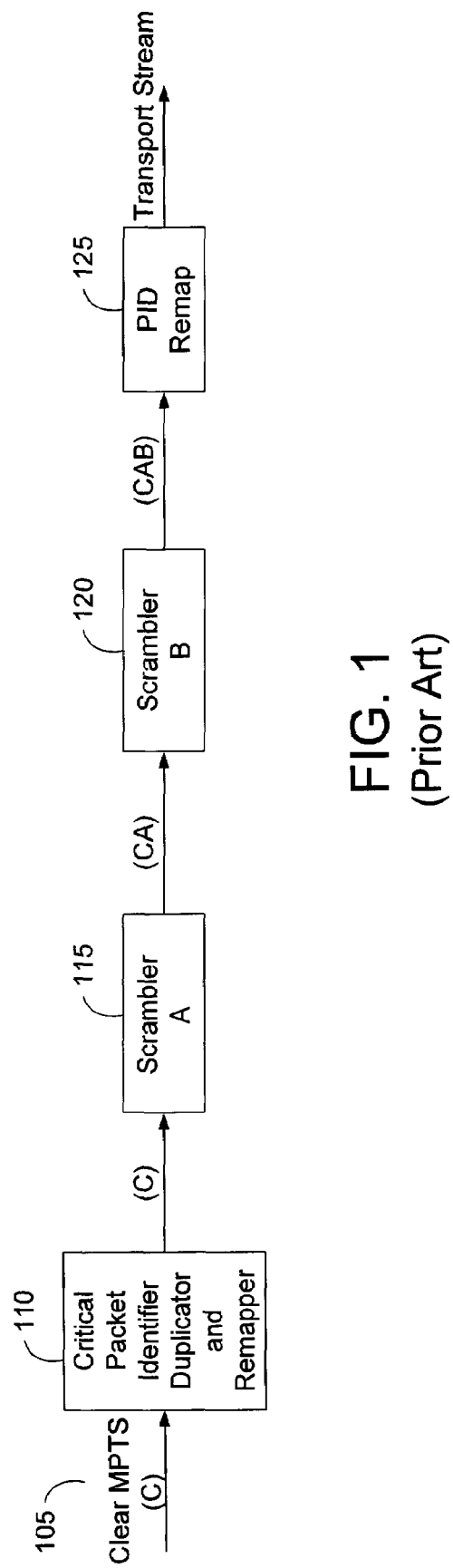
FIG. 1 is a block diagram of a prior art dual encryption process.
Figure 3:
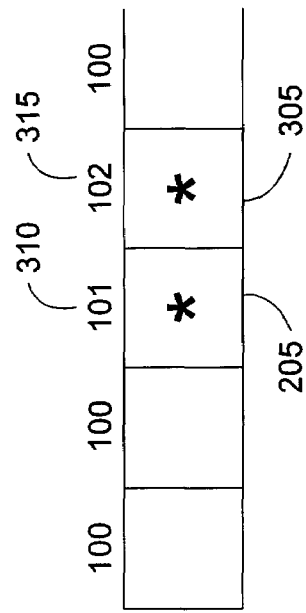
FIG. 3 is an illustration of the critical packet and the duplicated packet of FIG. 2.
Figure 2:
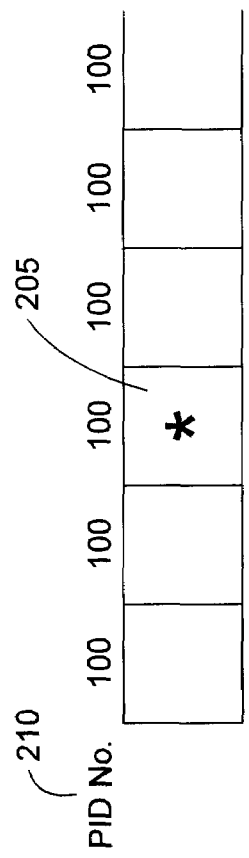
FIG. 2 is an illustration of a program including a critical packet.

FIG. 1 is directed towards a dual encryption scheme, and is taught in U.S. patent application serial no. US 2003/0026423 A1 by Unger. A clear stream 105 is provided to a critical packet identifier, duplicator, and remapper device (IDR) 110. The identifier device 100 identifies a critical packet in a program. FIG. 2 is an illustration of a stream including a critical packet 205 having a PID no. 210 (e.g., PID 100). The predetermined critical packet 205 is identified from the stream and duplicated. FIG. 3 is an illustration of the critical packet and the duplicated packet of FIG. 2. The IDR 110 of FIG. 1 then remaps the two critical packets (i.e., the critical packet 205 and the duplicated packet 305) to have differing PID values 310, 315. If, for example, the PID has an original value of 100, the IDR 100 may remap the critical packet 205 to have a PID value of 101 (310) and the duplicated packet 305 to have a PID value of 102 (315). It is also noted that the duplicated packet 305 is placed immediately following the critical packet 205 as taught by Unger.

Referring again to FIG. 1, Scrambler A 115 is then programmed to detect the PID values of the critical packets (e.g., PID 101) and scramble them with a first encryption scheme. Scrambler B 120 then detects the duplicated packets having the remapped PID value (e.g., PID 102) and scrambles them according to a second encryption scheme. The transport stream including the clear stream (C) and the two encryption streams (A and B) are subsequently provided to a PID remapper 125. The PID remapper 125 remaps the clear stream (C) to have the same PID value as the first encryption stream A (e.g., PID 100 to PID 101). The transported stream may then include, for example, a percentage, such as 98%, of the clear stream C and a percentage, such as 2%, of both of the encrypted streams A and B. In this manner, an incumbent set-top, which is designed to decrypt encryption scheme A, receives 98% of the clear stream and 2% of the encrypted stream A. The remaining 2% of the encrypted stream B is simply not processed and discarded.

There are, however, several disadvantages with the teachings of Unger. More specifically, Unger relies on controlling the incumbent headend encryption equipment to the level of specifying exactly which PIDs to encrypt, which would be extremely difficult to accomplish in some existing encryption systems. For example, a Scientific-Atlanta encryption system, as described in U.S. Pat. No. 6,424,717, does not provide a control interface to encrypt a specific PID. The encryption schemes are performed at the program level and would require extensive recreations of a program mapping table and its associated sessions. In contrast, the present invention does not require any changes to the incumbent headend equipment or require any special control. More specifically, the present invention simply utilizes the output of the existing headend equipment without modifications. Another disadvantage, is that the teachings of Unger require two operations on the clear stream by the overlayed headend equipment; specifically, a first time for the critical packet selection and again for the PID remapping. The present invention, however, only processes the streams once using one piece of equipment. Advantageously, this is an improvement that reduces the cost and the complexity of the system.

A further advantage of the present invention is that modification of the encryption percentage is accomplished as a function of available bandwidth in the system. For example, if there is additional bandwidth available, the present invention can increase the encrypted percentage from, for example, 2% to 6%. Notably, this feature is important to the system operators who need to be sensitive of both the required bandwidth and the security level of the programs.

Figure 4:
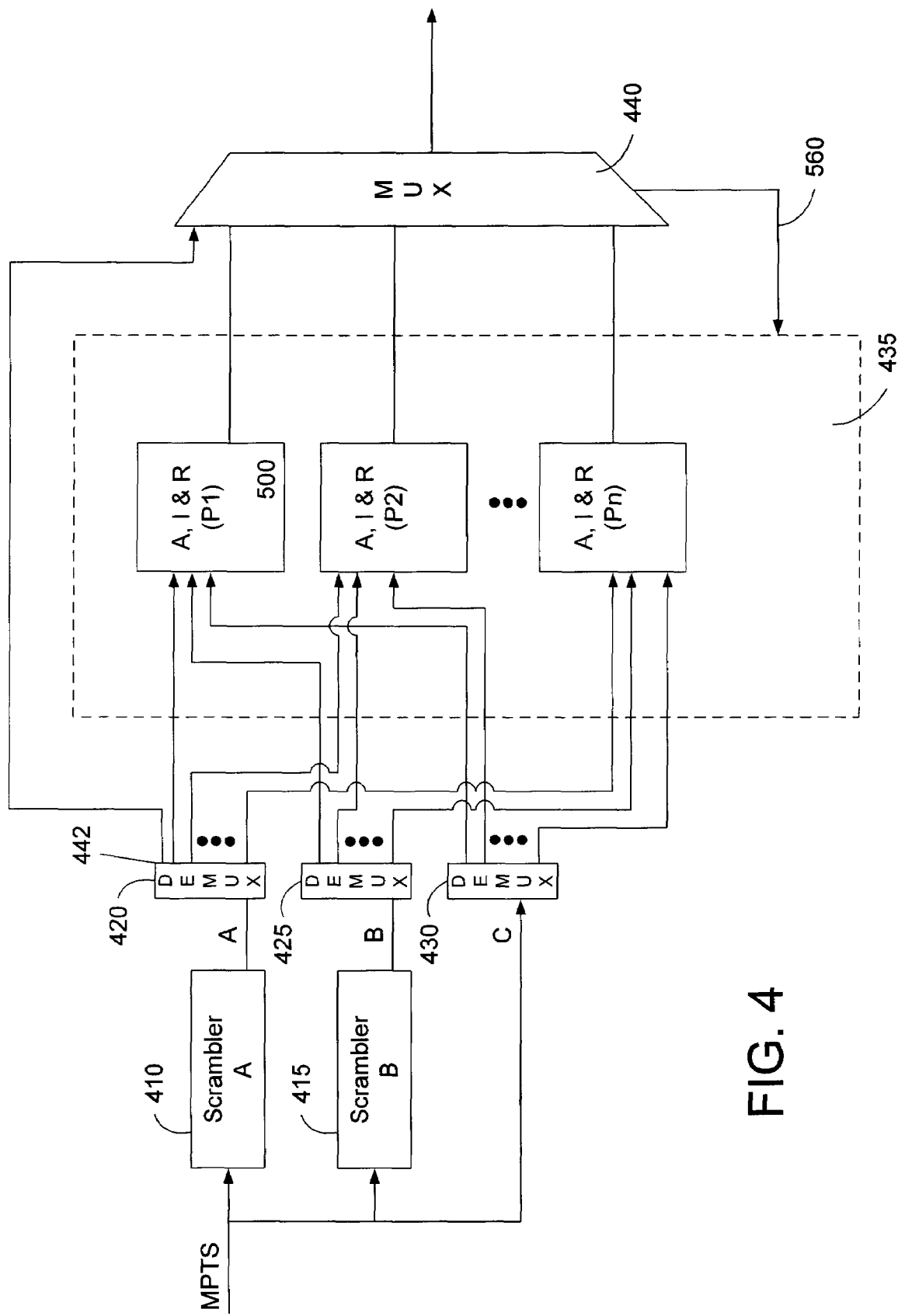
FIG. 4 is a block diagram of a first embodiment of a dual encryption scheme in accordance with the present invention.

Referring now to FIG. 4, a block diagram is illustrated depicting a first embodiment of a partial dual encryption scheme in accordance with the present invention. An MPTS, which is a clear stream C that includes a plurality of programs, is provided to scrambler A 410 and scrambler B 415. Scrambler A 410 and scrambler B 415 encrypts the clear stream C and respectively provides encrypted stream A and encrypted stream B. In a typical application, scrambler A 410 is the existing scrambler of the incumbent encryption scheme, and scrambler B is the additional scrambler required for the additional encryption scheme. A demultiplexer 420 is coupled to scrambler A 410 to demultiplex the encrypted stream A, which as mentioned includes a combination of programs, to provide a single program to a single output port. Similarly, demultiplexers 425 and 430 demultiplex the programs to provide the same single programs to an output port.

Figure 8:
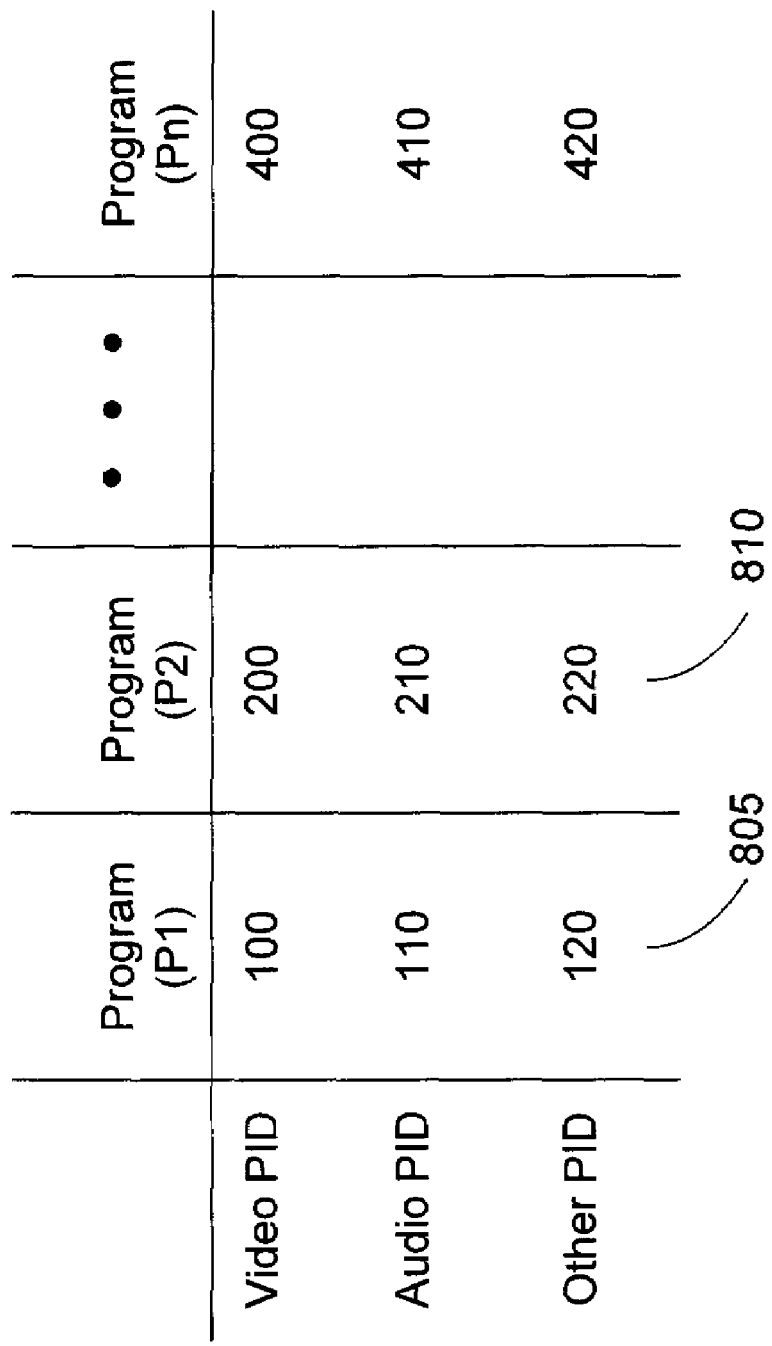
FIG. 8 provides an example table illustrating the single programs that may be provided to an output port of demultiplexers.

FIG. 8 provides an example table illustrating the single programs that may be provided to an output port of the demultiplexers 420, 425, 430 for further processing. For example, a first Program P1 805, which may include video PID 100, audio PID 110, and other PID 120, (which may be a data PID or second audio PID), may be sent to a first output port of demultiplexers 420, 425, 430. Similarly, a second Program P2 810, which may include video PID 200, audio PID 210, and other PID 220, may be sent to a second output port of demultiplexers 420, 425, 430. It will be appreciated that there can be any number of programs that can be provided to an output port.

Referring again to FIG. 4, an aligner, identifier, and remapper (AIR) device 435 receives the programs from the output ports of the demultiplexers 420, 425, 430, where the programs, or streams, (P1, P2, Pn) are grouped at the input of the AIR device 435, and is discussed below. The output streams of the AIR device 435 are provided to a multiplexer 440 that then provides a multiplexed partial dual encrypted transport stream. Additionally, the demultiplexer 420 coupled to scrambler A, which in this embodiment is assumed to be the incumbent scrambling scheme, also includes an output port 442 that provides undefined packets directly to the multiplexer 440. Due to the fact that there may be packets that are intended for purposes that are specific to the incumbent set-tops, these packets should be allowed to continue through the system without any potential alterations or deletion.

Figure 5:
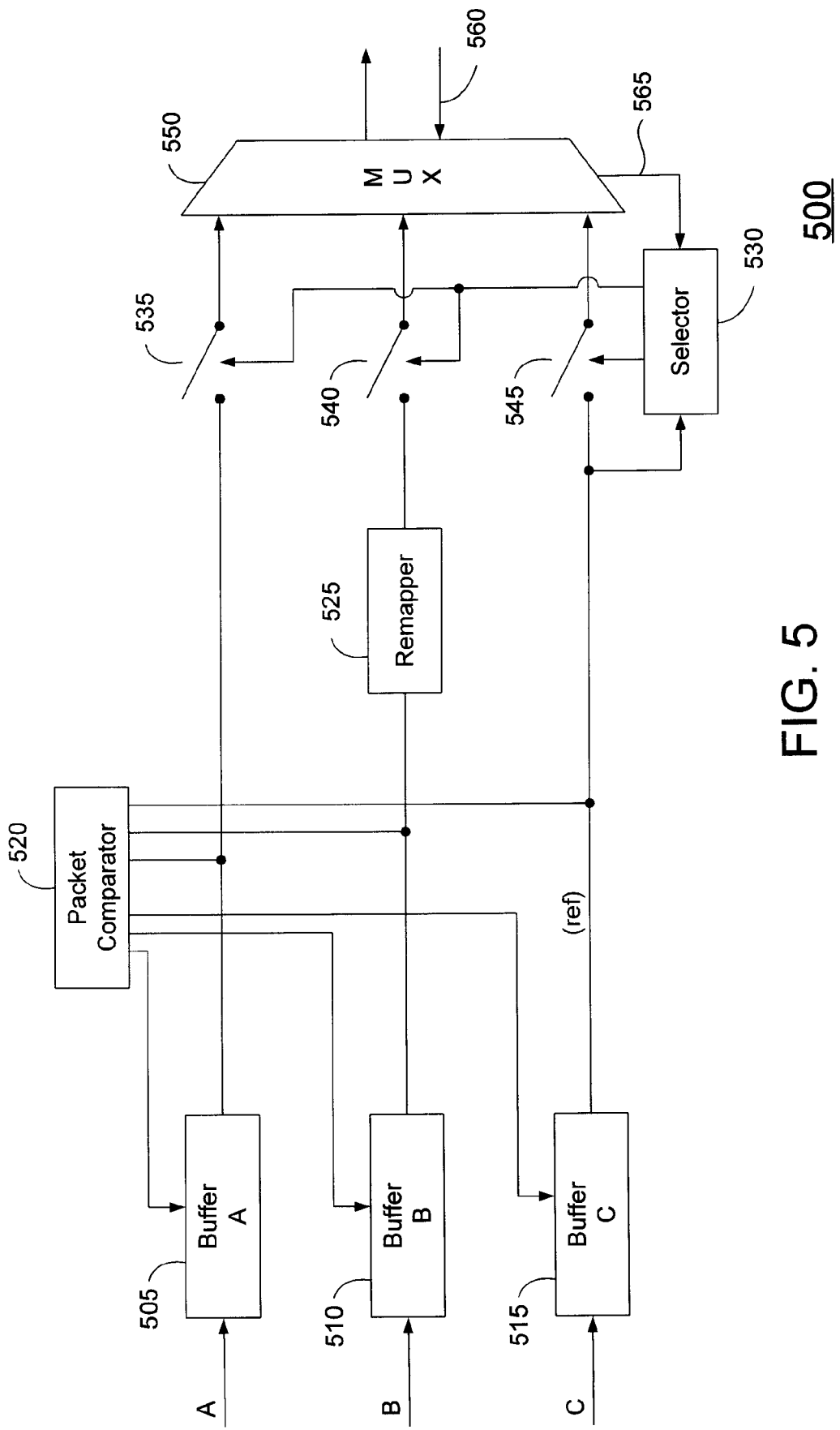
FIG. 5 is an illustration of one program aligner, identifier, and remapper (AIR) device in accordance with the present invention that is suitable for use in an AIR device of FIG. 4.

FIG. 5 is an illustration of one program aligner, identifier, and remapper (AIR) device 500 in accordance with the present invention that is suitable for use in the AIR device 435 of FIG. 4. It will be appreciated that the present invention in comparison with the prior art does not duplicate or remap critical packets. Additionally, it will be appreciated that more than one program AIR device 500 can be implemented in the AIR device 435 depending upon the number of programs (e.g., P1, P2, Pn) to be processed. Buffer A 505, buffer B 510, and buffer C 515 receive the streams A, B, and C from the output the demultiplexers 420, 425, 430. The buffers 505, 510, 515 allow a packet comparator 520 to monitor the streams A, B, and C and align them in time. Alignment may be necessary since the encrypted streams A and B may be somewhat delayed and out of synchronization due to the scramblers 410, 415.

Figure 9:
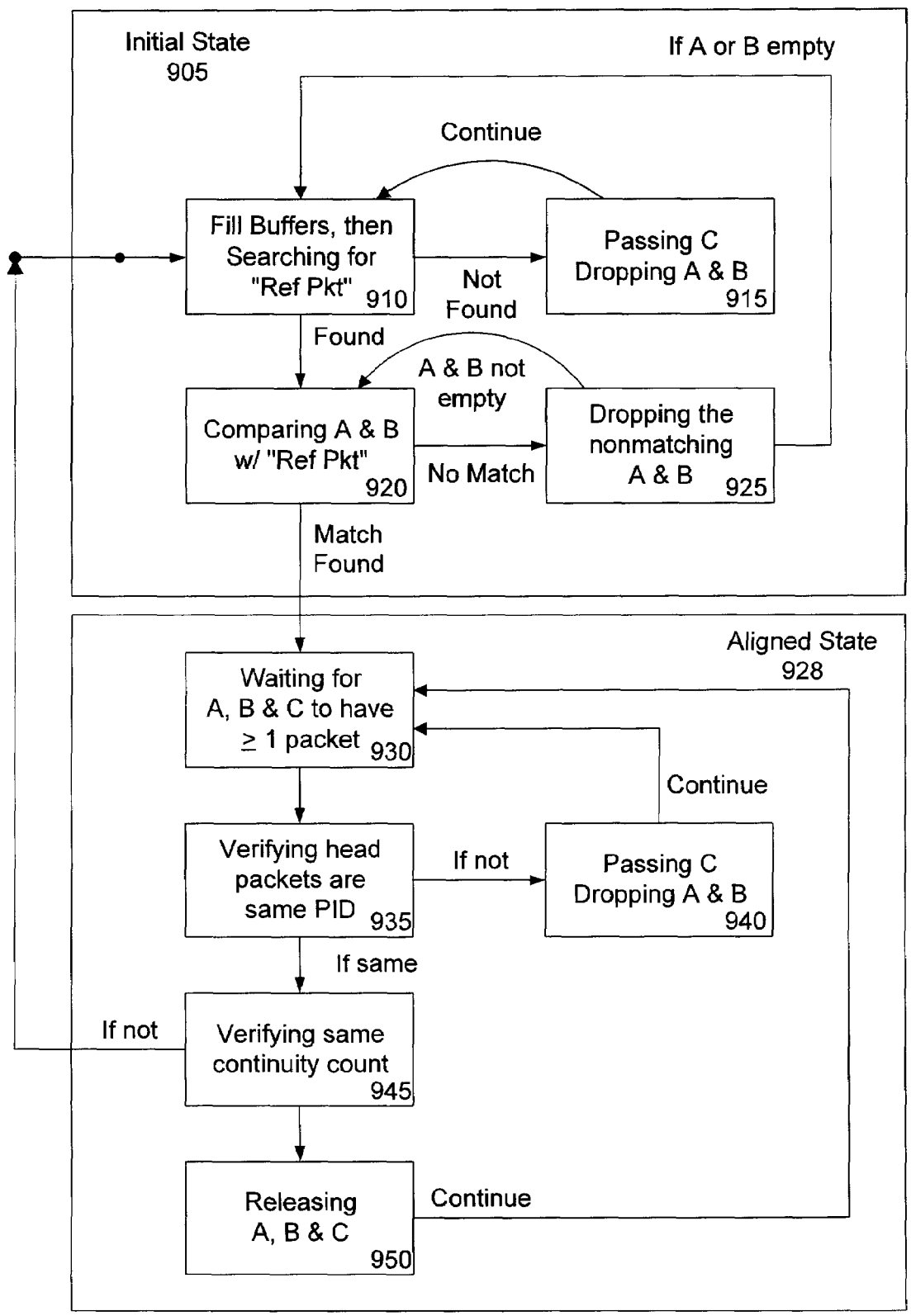
FIG. 9 is a state diagram illustrating the comparing of the packets by the packet comparator of FIG. 5.

FIG. 9 is a state diagram illustrating the comparing and aligning of the packets by the packet comparator 520. In the initial state 905, the buffers 505, 510, 515 are filled with packets, and the packet comparator 520 begins searching, in state 910, for a reference packet (ref pkt) in the clear stream, which is provided by buffer C 515. The reference packet may be, for example, a video PID with a payload_unit_start_indicator (PUSI) bit equal to one (1). It will be appreciated that the specifications for this reference packet may have other specifications, such as an audio PID and the PUSI bit may be equal to 0. The basis for comparison however must be valid for packets in the clear or scrambled state. Further information regarding the PUSI bit can be found in U.S. Pat. No. 6,424,714 entitled "Conditional Access System." If the reference packet is not found, the clear stream C passes, and the encrypted streams A and B drop in state 915. The searching state 910 continues until the reference packet is found in the clear stream C. Subsequently, in state 920, the encrypted streams A and B are compared to the found reference packet. The basis for comparison is again the video PID, and the presence of the PUSI bit equal to one (1). The basis for comparison is not affected by the fact that scrambler A 410 or B 415 has scrambled the packet. If the packets in either of the streams A and B do not match, the non-matching packet(s) drop in state 925. If buffers A 505 and B 510 are empty, the state returns to state 910 and begins searching. Otherwise, state 920 continues comparing the packets in streams A and B with the reference packet until a match is found, and the streams are then considered aligned.

In the aligned state 928, state 930 waits until buffers A 505, B 510, and C 515 have greater than one packet. Subsequently, the head packets are verified to have the same PID value, in state 935. If not, in state 940, the packet in stream C passes and packets in streams A and B drop, and state 935 continues verifying the packets. At times, packets in a program can be swapped in their position and are essentially out of order. In that case, passing the packets in the clear stream C ensure that the packets are passed rather than stalling in the buffers. If the head packet PID values are the same, the values of the continuity_counter field of the packets are then verified to be the same, in state 945. If not, the assumption is that there is an error in the alignment, and the comparator 520 returns to the initial state 905. It will be appreciated that the continuity counter of the clear stream C is used as the reference number. If the continuity counters are the same for the all the packets in the streams, state 950 releases the packets from the buffers A, B, and C, and returns to the aligned state 930 to continue ensuring alignment of the packets. It will be appreciated that there are other methods for verifying alignment, other than the use of the continuity_count value, such as the presence and length of an adaptation_field, or the presence and value of a program_clock_reference (PCR) value.

It should be noted that MPEG packet processing equipment typically modifies the Program Clock Reference (PCR) of programs being processed, to correct for any PCR jitter that would otherwise be introduced. In this embodiment, the PCRs of clear stream C are regarded as the primary PCRs, and all PCR modifications are performed on the values in stream C. If the PCR-bearing packet is also a critical packet, the corrected PCR value from stream C is placed into the PCR field in the packet from streams A and B.

Referring again to FIG. 5, a remapper 525 remaps the PID value of the released packet from stream B to a new PID value, for example, PID 100 to PID 101 and/or PID 110 to PID 111, depending upon whether the critical packet selection includes just video or audio packets or includes both video and audio packets. A switch 535, 540, 545 then gates the released packets of stream A, B, and C.

A selector 530 also receives the released packet of clear stream C, which it uses as a reference stream to control the switches 535, 540, 545. In the preferred embodiment of the present invention, the selector 530 allows the packets of the clear stream C to pass through to a multiplexer 550 until such time as a critical packet is detected. Again, it will be appreciated that the critical packet can be a video, audio, and/or data packet. When the critical packet is detected, the switch 545 opens and switches 535, 540 are closed, thereby allowing the released packets of encrypted streams A and B, which each have the aligned critical packet, to simultaneously pass through to the multiplexer 550. The multiplexer 550 then combines the packets to provide a partial dual-encrypted transport stream where the dual encryption includes packets encrypted by both scrambler A 410 and scrambler B 415. The multiplexed stream is then provided to multiplexer 440 (FIG. 4) to be combined with additional partial dual-encrypted program streams. It will be appreciated that multiplexer 550 provides only a portion of the packet stream to the overall multiplexer 440 of FIG. 4. In this manner, when bandwidth becomes available in multiplexer 440, a signal indicating an increase in encrypted packets is allowable is provided to multiplexer 550 via feedback loop 560. The multiplexer 550 then relays this information to the selector 530 via feedback loop 565, and the selector 530 can then increase the percentage of critical packets, for example, from 2% to 6% of the packets that are considered critical.

Figure 6:
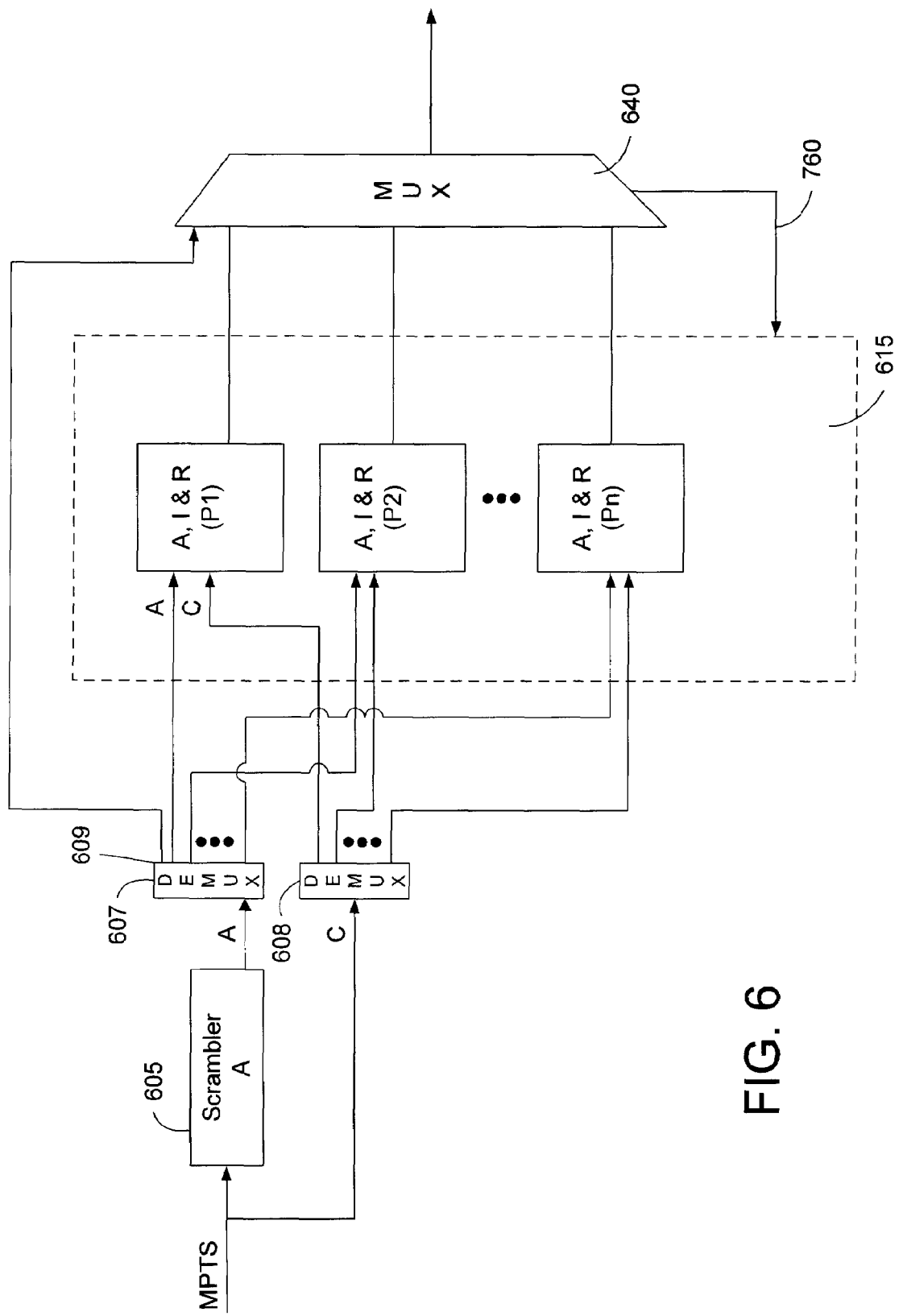
FIG. 6 is an illustration of a second embodiment of a dual encryption scheme in accordance with the present invention.

FIG. 6 is an illustration of a second embodiment of a partial dual encryption scheme in accordance with the present invention. The advantage of the configuration shown in FIG. 6 is that all the elements required to add an additional encryption scheme (Demux 607, 608, AIR devices 615, and Mux 640)

can be implemented in a single piece of equipment. An MPTS C is provided to scrambler A 605 that provides a first encrypted stream A. A first demultiplexer 607 receives the encrypted stream A and a second demultiplexer 608 receives the clear stream C in order to demultiplex the plurality of programs into single programs. Again, assuming the scrambler A 605 is the incumbent encryption scheme, an output port 609 of the demultiplexer 607 is provided for unidentified packets and is provided directly to a multiplexer 640 for delivery along with the partial dual-encrypted transport stream. The common programs from the demultiplexers 607, 608 are then provided to an aligner, identifier, and remapper (AIR) device 615.

Figure 7:
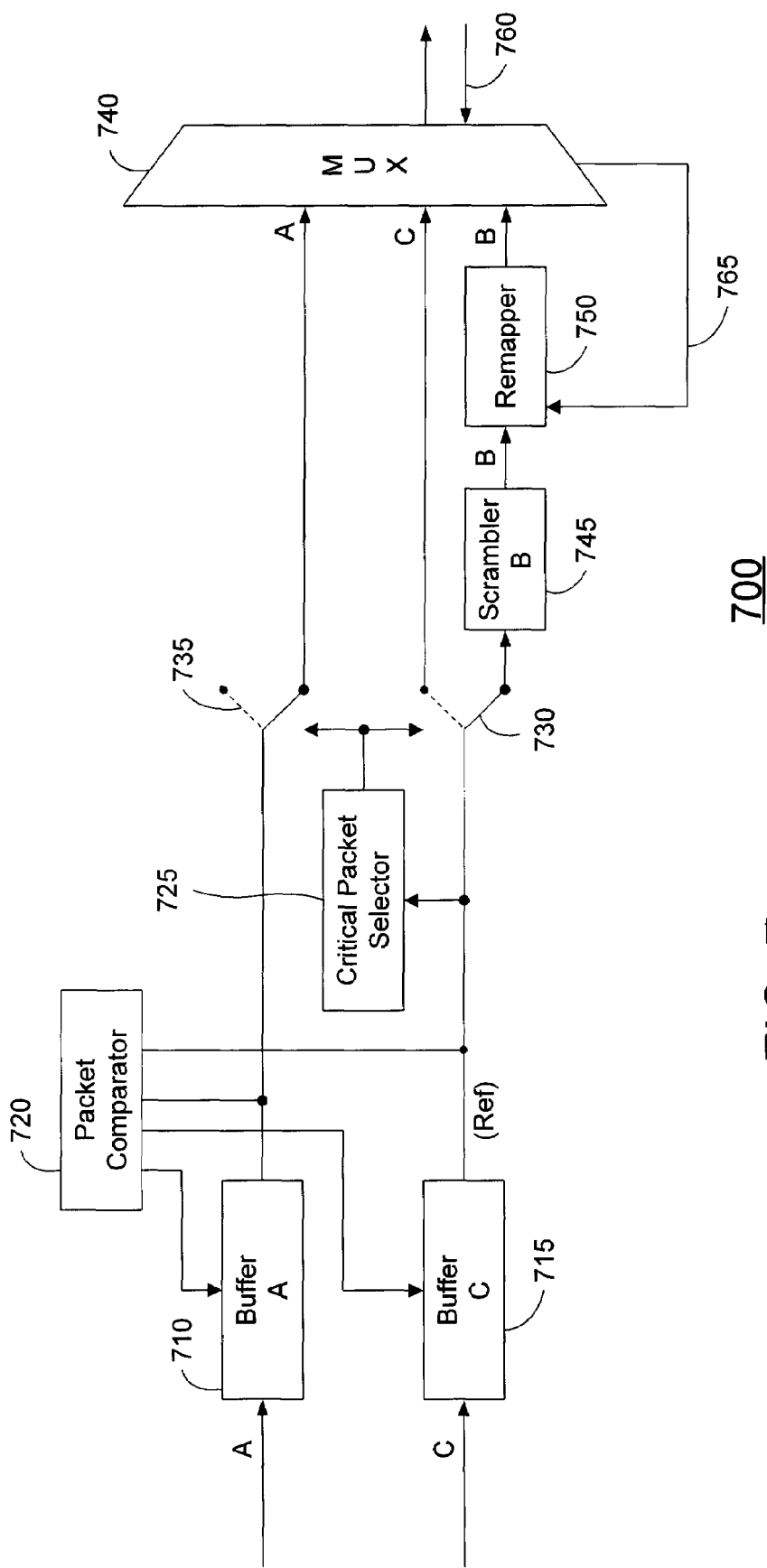
FIG. 7 is an illustration of one program aligner, identifier, and remapper (AIR) device in accordance with the present invention that is suitable for use in the AIR device of FIG. 6.

FIG. 7 is an illustration of one program aligner, identifier, and remapper (AIR) device 700 in accordance with the present invention that is suitable for use in the AIR device 615 of FIG. 6. For a first program P1, the encrypted stream A is buffered in buffer A 710, and buffer C 715 receives the clear stream C. A packet comparator 720 compares the packets to ensure they are aligned due to any delays introduced by scrambler A 705. It will be appreciated that the packet comparator 720 operates in a similar manner to the packet comparator 520 of FIG. 5 and in accordance with the state diagram of FIG. 9 for just encrypted stream A. A critical packet selector 725 uses the clear stream C as a reference stream and controls two switches 730, 735 accordingly. More specifically, switch 730 allows the packets of clear stream C to pass through to a multiplexer 740 until a critical packet is detected. When the critical packet is detected, switch 730 provides the packet of clear stream C to scrambler B 745 and switch 735 is also switched, thereby allowing the critical packet of encrypted stream A to pass through to the multiplexer 740. The scrambler B 745 encrypts the packet of clear stream C according to a second encryption method and provides the encrypted packet to a PID remapper 750. The PID remapper 750 remaps the packet's PID value to a new PID value (e.g., PID 100 to PID 101 and/or PID 110 to 111). The remapped packet is subsequently provided to the multiplexer 740 for transmitting along with the packet of the encrypted stream A. The scrambler B 745 also controls the PID comparator 720 in order to prevent packets from being transmitted until the scrambler B 745 and the remapper 750 have completed their steps, thereby maintaining proper ordering of packets.

A partial dual-encrypted transport stream is then provided to the multiplexer 640 (FIG. 6) to be combined with other partial dual-encrypted programs. The combined partial dual-encrypted transport stream is then provided to the set-tops and decrypted according to the decryption methods (i.e., encryption method A or encryption method B) of the set-top. Similar to the first embodiment of the present invention, multiplexer 740 provides only a portion of the packet stream to the overall multiplexer 640 of FIG. 6. In this manner, when bandwidth becomes available in multiplexer 640, a signal indicating an increase in encrypted packets is allowable is provided to multiplexer 740 via feedback loop 650. The multiplexer 740 then relays this information to the remapper 750 via feedback look 765, and the remapper 750 can then increase the percentage of critical packets, for example, from 2% to 6% of the packets that are considered critical.

Figure 10:
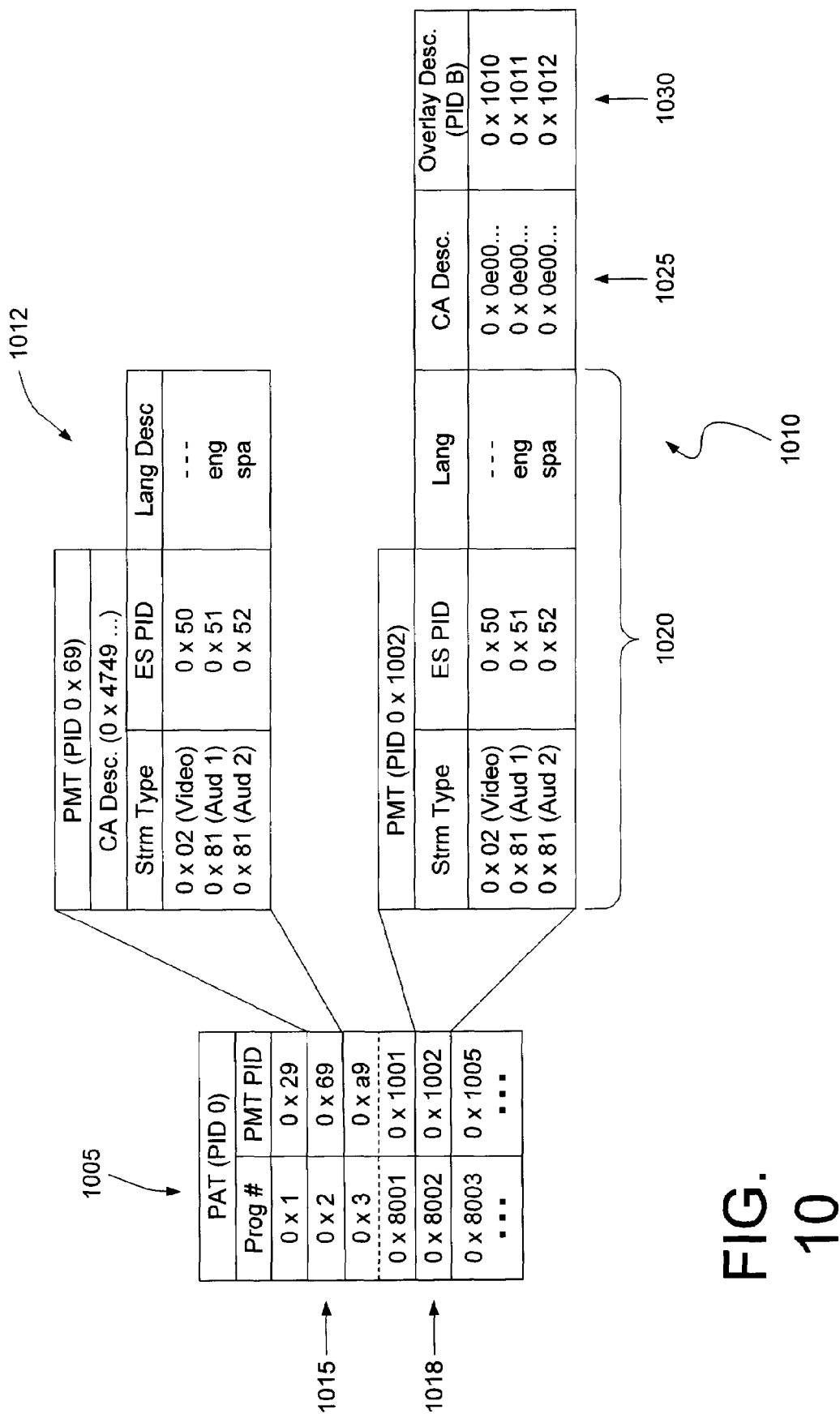
FIG. 10 illustrates a Program Association Table (PAT) that is suitable for use by the first and second set-tops in a dual-encrypted system in accordance with the present invention.

FIG. 10 illustrates a Program Association Table (PAT) 1005 that is suitable for use by the first and second set-tops in a dual-encrypted system in accordance with the present invention. It is known in the art that the PAT is periodically transmitted along with the program stream that the set-tops access in order to locate a desired program in the stream. The PAT contains a list of program numbers and their associated PID values for each program. Each program PID value in the PAT is then associated with a program map table (PMT). Included in the PMT are the PID numbers identifying the video, audio, and data packets for each associated program. It will be appreciated that the PAT PID values correspond with the PID values assigned by the remapper 525, 750 in order to ensure that the set-tops referencing the PAT for PID values are in line with the actual transmitted PID values of the packets.

By way of example and in accordance with the present invention, the PAT 1005 includes incumbent program numbers 1015 (i.e., 0x1, 0x2, 0x3), which point to programs that have been encrypted with the incumbent encryption scheme. Additionally, the PAT 1005 also provides second program numbers 1018 (i.e., 0x8001, 0x8002, 0x8003), which point to programs that have been encrypted with the second encryption scheme. Accordingly, the incumbent, or first, set-tops are designed to search for and receive the intended program numbers (i.e., 0x1, 0x2, 0x3) using their associated PMT, and the second set-tops are designed to search for and receive the second program numbers (i.e., 0x8001, 0x8002, 0x8003) using their associated PMT. In this manner, the incumbent set-tops work properly under any condition regardless of any manipulations that may be made to the transport stream. As previously mentioned, the present invention does not require any recreations of a program mapping table related to any incumbent set-tops in the system.

The second encrypted programs 1018, which are intended for the second set-tops, each have a different program map table (PMT) in accordance with the present invention, and one PMT 1010 is shown as an example. It will be appreciated that the PMTs 1012 for the incumbent encrypted programs 1015 remain unchanged having the original PID numbers to ensure that incumbent set-tops can properly decrypt their encrypted programs. The PMTs for the second encryption program numbers 1018 include the incumbent PMT 1020 plus additional overlay information 1025, 1030 for each PID number (e.g., 0x1010). In this manner, the second set-tops are directed to receive any of the desired packets that were sent in the clear having an incumbent PID value 1020 and also the second encrypted packets having an overlay PID 1030. It will be appreciated that all of the encrypted packets having the incumbent PID values 1020 are disregarded. In other words, the second encrypted PID values 1030 and the clear packets included in the first encrypted PID 1020 are necessary for the second set-top to properly decrypt and display the service. Additionally, in the PMT 1010 a conditional access descriptor 1025 signifies whether or not a conditional access overlay encryption scheme is used for the program.

It will be appreciated that modifications can be made to the embodiment of the present invention that is still within the scope of the invention. Additionally, the present invention can be implemented using hardware and/or software that are within the scope of one skilled in the art. The embodiments of the description have been presented for clarification purposes; however, the invention is defined by the following claims.

What is claimed is:

1. A communications system for encoding and transmitting a partial dual-encrypted program stream, the communications system for receiving a clear program stream, the clear program stream including a plurality of programs, each program including a plurality of packets, the communications system comprising:

a first encryptor for receiving the clear program stream and encrypting the plurality of programs according to a first encryption scheme;

a second encryptor for receiving the clear program stream and encrypting the plurality of programs according to a second encryption scheme;

a first demultiplexer for demultiplexing the first encrypted plurality of program streams to produce a plurality of first encrypted programs;

a second demultiplexer for demultiplexing the second encrypted plurality of program streams to produce a plurality of second encrypted programs;

a third demultiplexer for demultiplexing the clear program stream to produce a plurality of clear programs; and a plurality of identifier devices, each identifier device receiving at least one particular program from the plurality of first encrypted programs and receiving the same at least one particular program from the plurality of second encrypted programs and receiving the same at least one particular program from the plurality of clear programs, wherein the at least one particular program received by each identifier device is different in a form of encryption, each identifier device configured to:

identify critical packets in the at least one particular program from the plurality of clear programs; and pass rackets of the clear program stream that are not critical rackets;

wherein when the critical packet is identified by a packet identifier in the clear program stream, drop the identified critical packets in the at least one particular program from the plurality of the clear programs and pass corresponding critical packets in the at least one particular program from the plurality of first encrypted programs and in the at least one particular program from the plurality of second encrypted programs.

2. The communications system of claim 1, each identifier further configured to:

responsive to identification of non-critical packets in the particular program received from the clear programs, pass the non-critical packets in the particular program received from the clear programs and drop corresponding non-critical packets in the particular program received from the first and second encrypted programs.

3. The communications system of claim 1, further comprising a multiplexer for multiplexing the passed clear program packets, the first encrypted program packets, and the second encrypted program packets.

4. The communications system of claim 1, each identifier further comprising a remapper configured to encode a second encrypted program map table including audio and video packet identifiers for each program of the second encrypted program, and further configured to encode a program map table of the first encrypted program, and further configured to encode a program map table of the clear program.

* * * * *